United States Patent
Ogawa

(10) Patent No.: US 8,280,017 B2
(45) Date of Patent: Oct. 2, 2012

(54) COMMUNICATION TERMINAL APPARATUS

(75) Inventor: Kimiaki Ogawa, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1043 days.

(21) Appl. No.: 12/237,043

(22) Filed: Sep. 24, 2008

(65) Prior Publication Data
US 2009/0080625 A1    Mar. 26, 2009

(30) Foreign Application Priority Data
Sep. 25, 2007 (JP) .................................. 2007-247864

(51) Int. Cl.
*H04M 11/00* (2006.01)
(52) U.S. Cl. .......... 379/100.06; 379/100.01; 379/100.16
(58) Field of Classification Search ............. 379/100.16, 379/100.01, 100.06, 93.09, 93.11
See application file for complete search history.

(56) References Cited

U.S. PATENT DOCUMENTS

| | | | | |
|---|---|---|---|---|
| 5,809,132 | A * | 9/1998 | Sakamoto | 379/377 |
| 6,208,731 | B1 * | 3/2001 | DePond et al. | 379/376.01 |
| 6,697,471 | B1 * | 2/2004 | Chan et al. | 379/142.08 |
| 2005/0031098 | A1 * | 2/2005 | Ito | 379/100.01 |
| 2006/0215229 | A1 * | 9/2006 | Ito | 358/442 |
| 2006/0233329 | A1 * | 10/2006 | Ito | 379/100.01 |

FOREIGN PATENT DOCUMENTS
JP    H-8-289039    11/1996

* cited by examiner

*Primary Examiner* — Stella Woo
(74) *Attorney, Agent, or Firm* — Rabin & Berdo, P.C.

(57) ABSTRACT

A communication terminal apparatus is provided capable of preventing a misunderstanding that the external attachment telephone is hooked up, so that the external attachment telephone can be correctly shifted to a receiving mode. In the apparatus, a ring signal detecting section detects a ring signal sent by a line exchange machine from a line; and a hookup detecting section monitors a line voltage of the line and detects a hookup of an external attachment telephone. In the hookup detecting section, a line voltage detecting section detects the line voltage on the line; a reference voltage outputting section outputs a reference voltage; a threshold value voltage switching section switches to a threshold value voltage representing a first voltage level or switches to a threshold value voltage representing a second voltage level; and a voltage comparing section compares the reference voltage with the line voltage when the ring signal is detected. When a comparison result indicates that a difference is or over a threshold value voltage representing the first voltage level, it is detected that the external attachment telephone is hooked up.

5 Claims, 11 Drawing Sheets

LINE VOLTAGE Vi

LINE VOLTAGE Vo

COMMUNICATION TERMINAL APPARATUS

FIELD OF THE INVENTION

The invention relates to a communication terminal apparatus having an external attachment telephone.

BACKGROUND OF THE INVENTION

A former communication terminal apparatus having external attachment telephone, detects a hookup of the external attachment telephone through a change of line voltage. That is, the former communication terminal apparatus samples the line voltage that is supplied to line, and compares the sampled line voltage (as a following line voltage) with a line voltage (as a previous line voltage) that was sampled a certain time earlier than the following line voltage. Then, the former communication terminal apparatus detects that the external attachment telephone is hooked up when the number of times counted in the case that a voltage difference between the following line voltage and the previous line voltage sampled a certain time earlier than the following line voltage becomes a predetermined threshold value or over, continuously reaches a predetermined number of times (for example, refer to patent document 1).

Patent document 1: Japan patent publication Hei8-289039.

The communication terminal apparatus is connected with a line exchange machine. As the line exchange machine, for example, a subscriber line exchange machine furnished by an electric communication business company; and a private line exchange machine (PBX) furnished in branch by user are adopted. In these line exchange machines, line voltage that is supplied to line between the line exchange machine and the communication terminal apparatus is different. Here, the subscriber line exchange machine uses high line voltage; the private line exchange machine uses low line voltage.

The former communication terminal apparatus stated above, receives a ring signal from the line exchange machine according to a predetermined time interval. In the communication terminal apparatus, from the time that the ring signal is received to the time that a next ring signal is received, through the change of line voltage, such case occurs that the number of times counted when a voltage difference between the following line voltage and the previous line voltage sampled a certain time earlier than the following line voltage becomes a predetermined threshold value or over, continuously reaches a predetermined number of times. Thus, in the former communication terminal apparatus, though the external attachment telephone is not hooked up in fact, it is misunderstood that it has been hooked up and is not shifted to a receiving mode. Especially, when the line exchange machine whose line voltage is low is compared with the line exchange machine whose line voltage is high, in the case to receive a change of the same line voltage, because the ratio of the voltage that has changed becomes higher with respect to the threshold value, it is mostly misunderstood that the external attachment telephone was hooked up.

SUMMARY OF THE INVENTION

It is, therefore, an object of the invention to provide a communication terminal apparatus capable of solving the above problem. That is, according to the change of line voltage of line that is connected to the line exchange machine, it is possible to prevent a misunderstanding that the external attachment telephone was hooked up, so that the communication terminal apparatus can be shifted to a receiving mode.

An aspect of the invention is to provide a communication terminal apparatus. The communication terminal apparatus comprises a ring signal detecting section that detects a ring signal that is sent by a line exchange machine on a line; and a hookup detecting section that monitors a line voltage of the line and detects a hookup of an external attachment telephone, wherein the hookup detecting section, includes a line voltage detecting section that detects the line voltage that is provided to the line; a reference voltage outputting section that outputs a reference voltage in order to judge whether or not the external attachment telephone is hooked up; a threshold value voltage switching section that, switches to a threshold value voltage representing a first voltage level when the ring signal is detected by the ring signal detecting section, and switches to a threshold value voltage representing a second voltage level when shifting to a receiving mode; and a voltage comparing section that, when the ring signal is detected by the ring signal detecting section, compares the reference voltage outputted by the reference voltage outputting section with the line voltage detected by the line voltage detecting section, wherein the hookup detecting section detects whether or not the external attachment telephone is hooked up according to a result of the voltage comparing section.

Another aspect of the invention is to provide a communication terminal apparatus. The communication terminal apparatus comprises a ring signal detecting section that detects a ring signal that is sent by a line exchange machine on a line; and a hookup detecting section that monitors a line voltage of the line and detects a hookup of an external attachment telephone, wherein the hookup detecting section, includes a line voltage detecting section that detects a line voltage provided to the line; a reference voltage outputting section that outputs a reference voltage in order to judge whether or not the external attachment telephone is hooked up; a threshold value voltage switching section that, switches to a threshold value voltage obtained from one of plural voltage levels when the ring signal is detected by the ring signal detecting section, and switches to a threshold value voltage representing a lowest voltage level when shifting to a receiving mode; and a voltage comparing section that, when the ring signal is detected by the ring signal detecting section, compares the reference voltage outputted by the reference voltage outputting section with the line voltage detected by the line voltage detecting section, wherein the hookup detecting section detects whether or not the external attachment telephone is hooked up according to a result of the voltage comparing section.

Effect of the Present Invention

According to the invention, because the hookup detecting section detects that the external attachment telephone was hooked up, when a difference between reference voltage and line voltage is or above a threshold value voltage representing a high voltage level that is switched the threshold value voltage switching section according to a comparison result of the voltage comparing section, through comparing with such case that a threshold value voltage representing a low voltage level is used, it is possible to perform a hookup detection strictly and correctly. Thus, even if the line voltage of the line that is connected with the line exchange machine changes, it is possible to prevent the misunderstanding that the external attachment telephone was hooked up, so that the communication terminal apparatus can be shifted to a receiving mode.

The above and other objects and features of the present invention will become apparent from the following detailed description and the appended claims with reference to the accompanying drawings.

DETAILED DESCRIPTION OF THE PREFERRED EMBODIMENTS

Embodiments of the invention will be described in detail hereinbelow with reference to the drawings.

Embodiment 1

Figure 1:
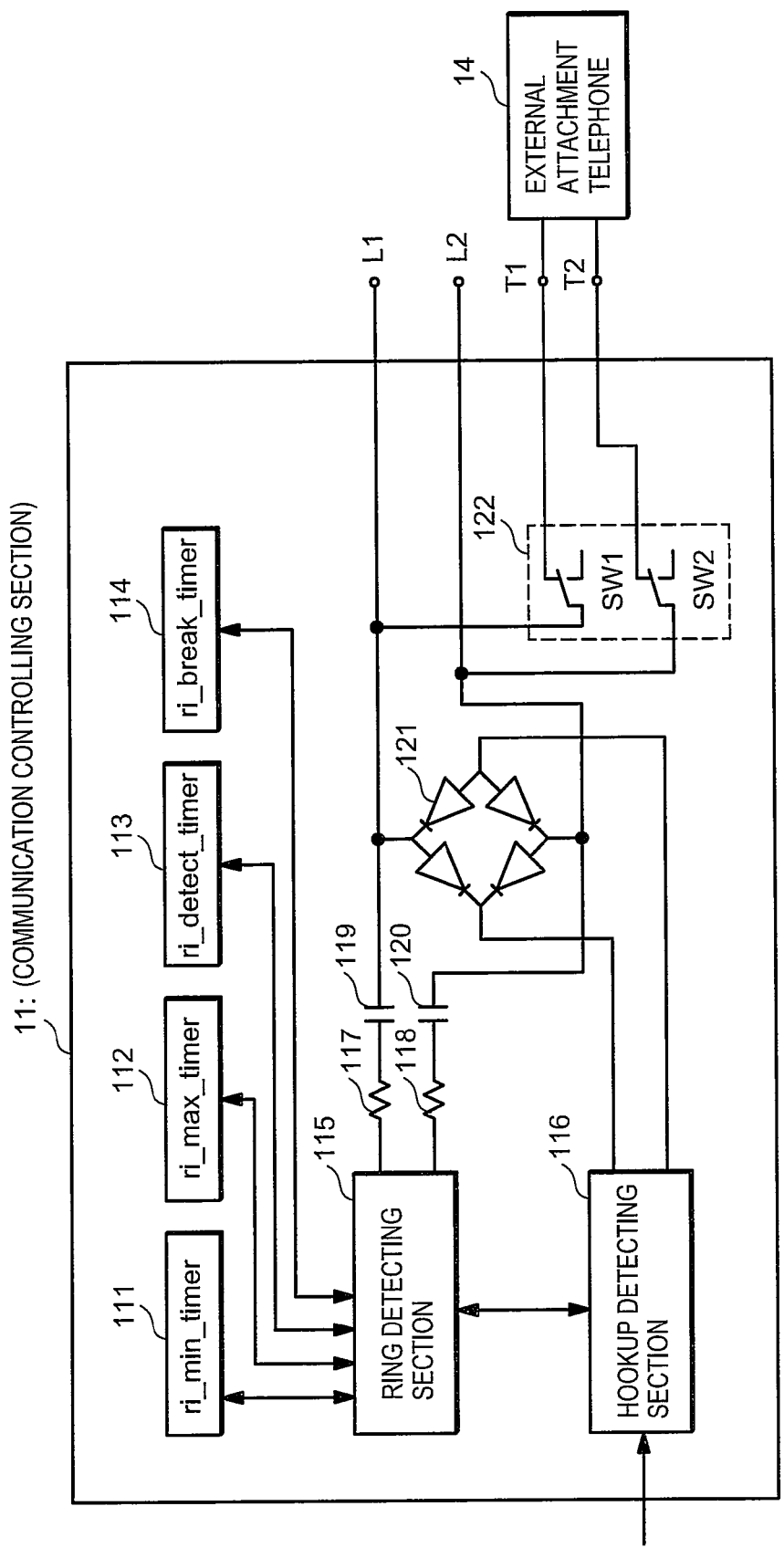
FIG. 1 is a block diagram showing a structure of a communication controlling section in a communication terminal apparatus of embodiment 1 of the present invention.
Figure 2:
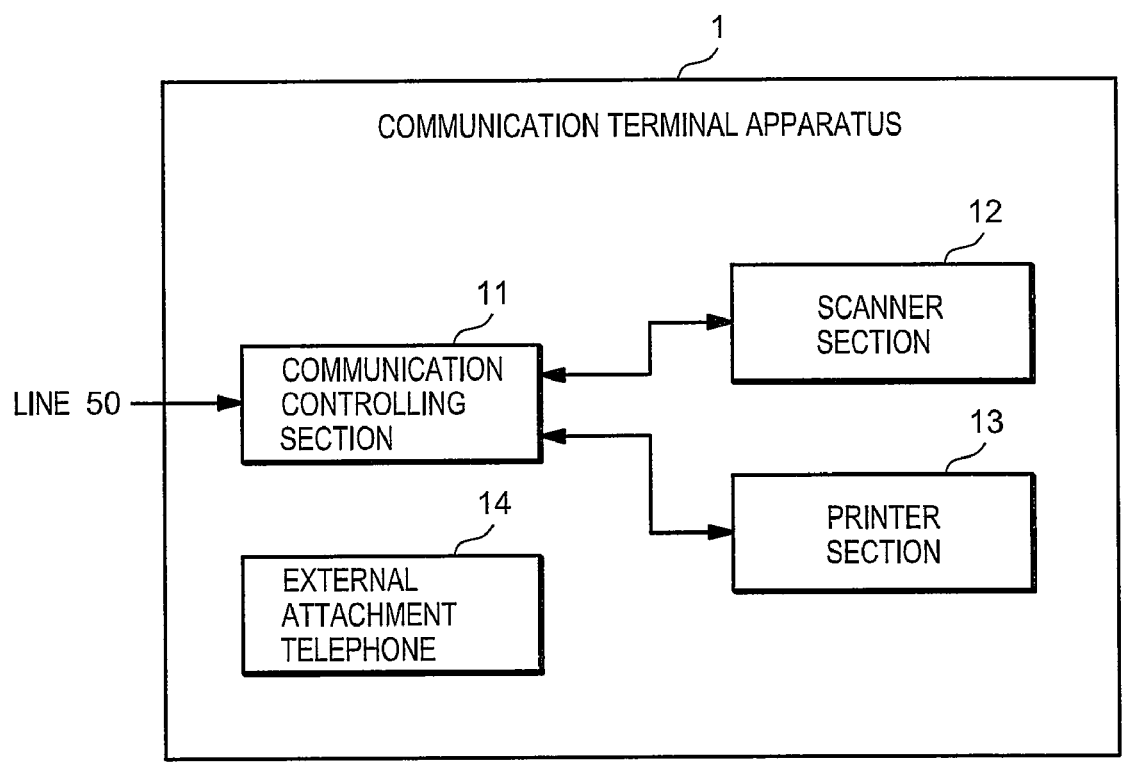
FIG. 2 is a block diagram showing a structure of a communication terminal apparatus in embodiment 1 of the present invention.

FIG. 1 is a block diagram showing a structure of a communication controlling section in a communication terminal apparatus of embodiment 1 of the present invention; and FIG. 2 is a block diagram showing a structure of a communication terminal apparatus in embodiment 1 of the present invention.

A communication terminal apparatus of the embodiment 1, as shown by FIG. 2, includes a communication controlling section 11, a scanner section 12, a printer section 13 and an external attachment telephone 14.

The communication controlling section 11, as shown by FIG. 1, includes a ri_min_timer 111, a ri_max_timer 112, a ri_detect_timer 113, a ri_break_timer 114, a ring detecting section 115, a hookup detecting section 116, a resistance 117, a resistance 118, a condenser 119, a condenser 120, a diode bridge 121 and a relay 122. Here, the ring detecting section 115 and the hookup detecting section 116, are generated through CPU (not shown) executes a control program stored in a ROM (not shown), they form a part of the communication controlling section 11.

The ri_min_timer 111, when a signal that requests a time check (hereinafter: time check request signal) is inputted from the ring detecting section 115, for example, starts the time check for a period of 400 ms. Further, the ri_min_timer 111, after ended the time check for a period of 400 ms, outputs a signal representing that the time check was ended (hereinafter: time check end signal) to the ring detecting section 115. Furthermore, the ri_min_timer 111, when received a signal to request a stoppage of the time check (hereinafter: time check stoppage request signal) from the ring detecting section 115, ends the time check.

The ri_max_timer 112, when the time check request signal is inputted from the ring detecting section 115, for example, starts the time check for a period of 1200 ms. Further, the ri_max_timer 112, after ended the time check for a period of 1200 ms, outputs a time check end signal representing that the time check was ended, to the ring detecting section 115. Furthermore, the ri_max_timer 112, when a time check stoppage request signal is inputted from the ring detecting section 115, ends the time check.

The ri_detect_timer 113, when a time check request signal is inputted from the ring detecting section 115, for example, starts the time check for a period of 1800 ms. Further, the ri_detect_timer 113, after ended the time check for a period of 1800 ms, outputs a time check end signal representing that the time check was ended, to the ring detecting section 115. Furthermore, the ri_detect_timer 113, when a time check stoppage request signal is inputted from the ring detecting section 115, ends the time check.

The ri_break_timer 114, when a time check request signal is inputted from the ring detecting section 115, for example, starts the time check for a period of 2200 ms. Further, the ri_break_timer 114, after ended the time check for a period of 2200 ms, outputs a time check end signal representing that the time check was ended, to the ring detecting section 115.

The ring detecting section 115, usually monitors that ring signal is sent from a line 50. Then, the ring detecting section 115 outputs a ring signal detection signal representing that the ring signal was received from the line 50, to the hookup detecting section 116; and outputs a time check request signal to the ri_min_timer 111 and the ri_max_timer 112.

Further, the ring detecting section 115, when a time check end signal is inputted from the ri_min_timer 111, at the time that the time check end signal is inputted, judges whether or not the ring signal has been received. Then, the ring detecting section 115, when judged that the ring signal has not been received at the time that the time check end signal is inputted, recognizes the received ring signal as noise; outputs a time check stoppage request signal to the ri_max_timer 112, and monitors again the receiving of ring signal.

Further, the ring detecting section 115, when a time check end signal from the ri_max_timer 112 is inputted, at the time that the time check end signal is inputted, judges whether or not a ring signal has been received. Then, on the one hand, the ring detecting section 115, when judged that the ring signal has been received at the time that the time check end signal is inputted, recognizes the received ring signal as noise and monitors again the receiving of ring signal.

On the other hand, the ring detecting section 115, when judged that the ring signal has not been received at the time that the time check end signal is inputted, further judges whether a ring signal detection flag stored in a RAM (not shown) is "ON" or "OFF". The ring signal detection flag is information representing whether or not ring signal was at least received once until now, from the line exchange machine, according to a predetermined time interval, after the ring detecting section 115 started to monitor the receiving of the ring signal. When the information is "ON", it represents that the ring signal was at least received once until now; when the information is "OFF", it represents that the ring signal has not been received once.

The ring detecting section 115, when judged that the ring signal detection flag stored in the RAM is "OFF", changes the ring signal detection flag that has been stored in the RAM from "OFF" to "ON". Then, the ring detecting section 115, outputs a time check request signal to the ri_detect_timer 113 and the ri_break_timer 114; and outputs a sampling start request signal to a sampling signal generating section 1165 of the hookup detecting section 116 to request a start to output sampling signal.

Further, the ring detecting section 115, when a time check end signal is inputted from the ri_detect_timer 113, at the time that the time check end signal is inputted, judges whether or not the ring signal has been received. Then, the ring detecting section 115, when judged that the ring signal has been received at the time that the time check end signal is inputted, recognizes the received ring signal as doubling; outputs a time check stoppage request signal to the ri_detect_timer 113; and monitors again the receiving of the ring signal.

Further, the ring detecting section 115 judges whether or not a time check end signal is inputted from the ri_break_timer 114. on the one hand, if the time check end signal is inputted from the ri_break_timer 114, the ring detecting section 115 outputs a ring signal detection period end signal representing that the period to detect the ring signal ended, to a selector 1164 and the sampling signal generating section 1165 of the hookup detecting section 116. On the other hand, the ring detecting section 115, when judged that the time check end signal is not inputted from the ri_break_timer 114, monitors the receiving of the ring signal.

Figure 3:
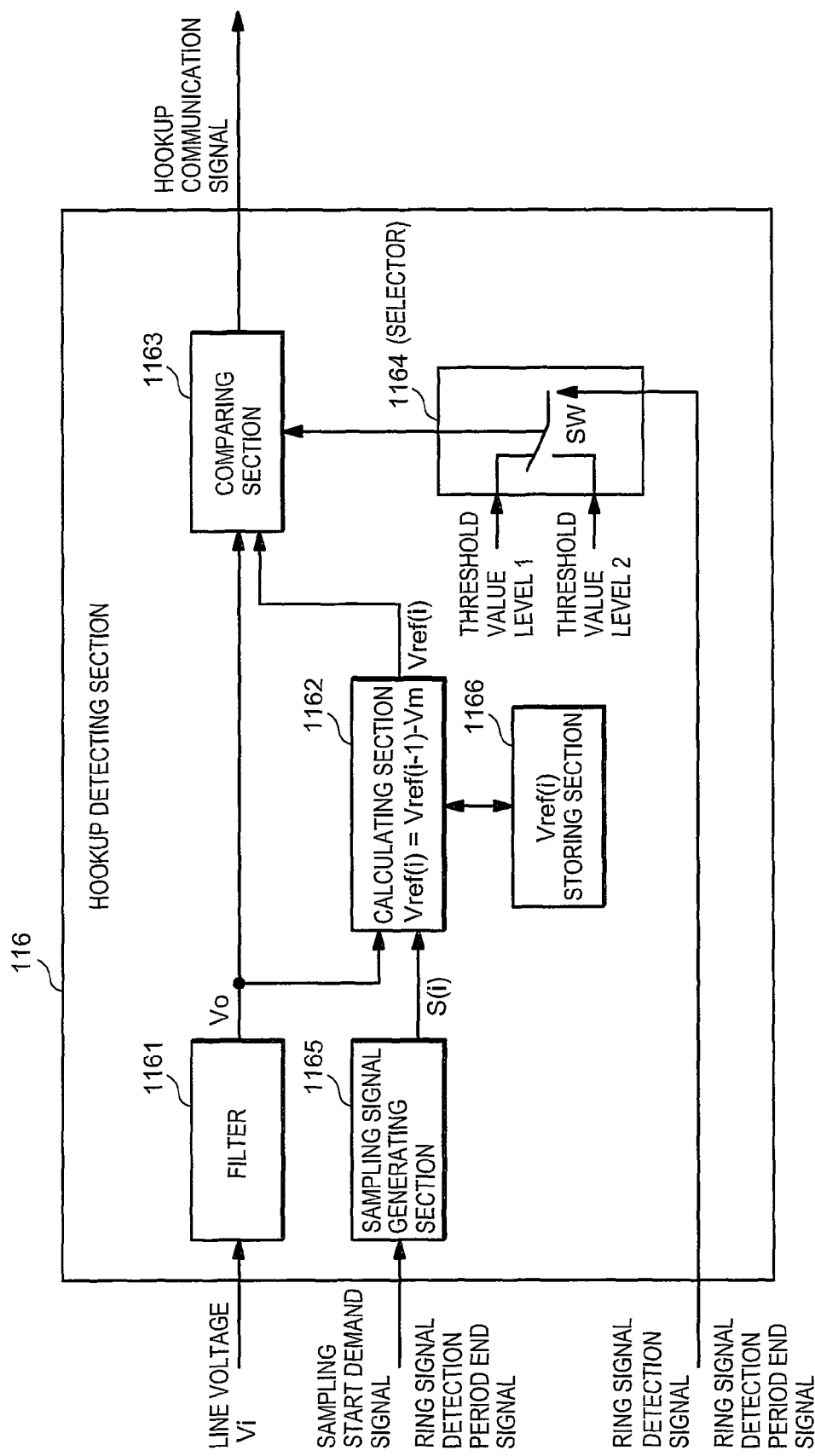
FIG. 3 is a block diagram for showing a structure of a hookup detecting section in FIG. 1.

FIG. 3 is a block diagram for showing a structure of a hookup detecting section in FIG. 1.

The hookup detecting section 116, as shown by FIG. 3, includes a filter 1161, a calculating section 1162, a comparing section 1163, a selector 1164, a sampling signal generating section 1165 and a Vref(i) storing section 1166.

Figure 4A:
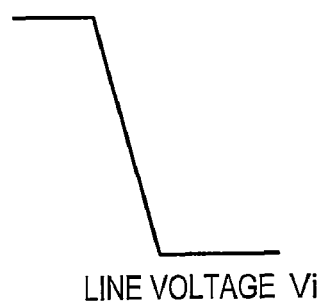
FIG. 4A is an explanation diagram for explaining respective signals in a hookup detecting section in FIG. 1 (I)
Figure 4B:
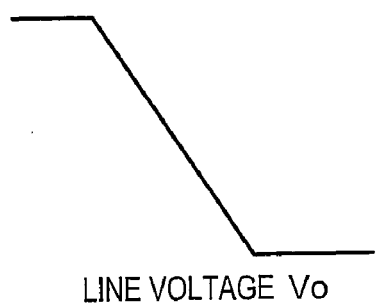
FIG. 4B is an explanation diagram for explaining respective signals in a hookup detecting section in FIG. 1 (II)
Figure 4C:
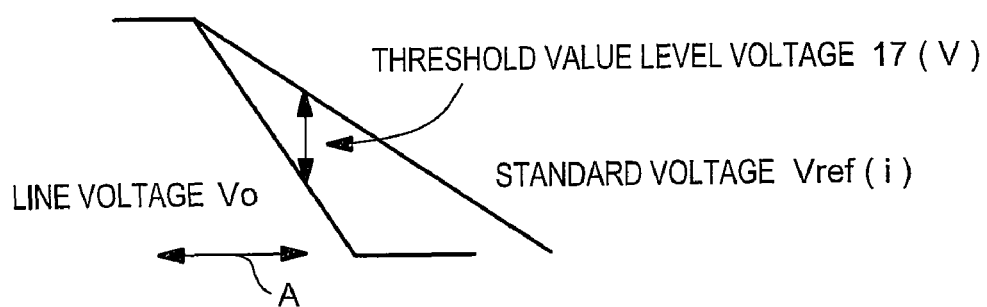
FIG. 4C is an explanation diagram for explaining respective signals in a hookup detecting section in FIG. 1 (III)

FIG. 4A, FIG. 4B and FIG. 4C are an explanation diagrams for explaining respective signals in a hookup detecting section in FIG. 1.

The filter 1161, is a low pass filter, for example, changes a line voltage Vi inputted from the line 50 to a voltage Vo (hereinafter: line voltage Vo) which drops smoothly, as shown by FIGS. 4A and 4B; and outputs the line voltage Vo to the calculating section 1162 and the comparing section 1163.

The calculating section 1162 shown by FIG. 3, when a sampling signal S(i) is inputted from the sampling signal generating section 1165, calculates a reference voltage Vref (i)=(Vref(i-1)-Vm) as a reference in order to detect a hookup; outputs the reference voltage Vref(i) to the comparing section 1163; and writes the reference voltage Vref(i) into the Vref(i) storing section 1166. Here, the voltage of reference voltage Vref(1)(i=1) is the line voltage Vo that is inputted from the filter 1161, when the sampling signal is firstly inputted from the sampling signal generating section 1165. Vm is a numerical value that has been prescribed in a MODEM, the numerical value is 0.35 (v).

The comparing section 1163 compares a voltage (Vref(i)-Vo(i)) (hereinafter: difference voltage) that is a difference between the reference voltage Vref(i) that is inputted from the calculating section 1162 and the line voltage Vo that is inputted from the filter 1161 with a voltage, for example 17(v), of threshold value level 2 that is supplied from the selector 1164. The comparing section 1163, when judged that the difference voltage is or over 17 (v) of the threshold value level 2 according to a comparison result of the both, recognizes that the external attachment telephone 14 is hooked up, and outputs a hookup notification signal to the ring signal detecting section 115.

The selector 1164, when a ring signal detection signal is inputted from the ring signal detecting section 115, separates a terminal of switch SW from a terminal that supplies the voltage 10 (v) of threshold value level 1, and connects the terminal of switch SW with a terminal that supplies the voltage of the threshold value level 2. Then, the selector 1164 outputs the voltage of the threshold value level 2 to the comparing section 1163.

Further, the selector 1164, when the ring signal detection period end signal stated above is inputted from the ring signal detecting section 115, separates the terminal of switch SW from the terminal that provides the voltage of the threshold value level 2, and connects the terminal of switch SW with the terminal that provides the voltage 10 (v) of the threshold value level 1. Then, the selector 1164 outputs the voltage 10 (v) of the threshold value level 1 to the comparing section 1163.

The sampling signal generating section 1165, when a sampling start request signal is inputted from the ring signal detecting section 115, outputs a sampling signal S(i) in a cycle that was decided previously to the calculating section 1162. Further, the sampling signal generating section 1165, when a ring signal detection period end signal is inputted from the ring signal detecting section 115, stops the output of the sampling signal S(i) with respect to the calculating section 1162.

The Vref(i) storing section 1166, is formed from a RAM to store the Vref(i) that was calculated by the calculating section 1162.

The diode bridge 121 shown by FIG. 1, separately outputs the line voltage Vi that is inputted from the line 50 to the ring signal detecting section 115 and the hookup detecting section 116.

The relay 122, in a usual state, sets switch SW1 to connect a terminal L1 that has been connected to the line 50 with a terminal T1 that has been connected to the external attachment telephone 14, and sets switch SW2 to connect a terminal L2 that has been connected to the line 50 with a terminal T2 that has been connected to the external attachment telephone 14 as well. Further, the relay 122, when the communication terminal apparatus 1 enters a communication mode, sets the switch SW1 to separate the terminal L1 that has been connected to the line 50 from the terminal T1 that has been connected to the external attachment telephone 14, and sets the switch SW2 to separate the terminal L2 that has been connected to the line 50 from the terminal T2 that has been connected to the external attachment telephone 14 as well.

The scanner section 12 shown by FIG. 2 reads out an image to be printed and stores its image data into a video RAM that is not shown. Further, the scanner section 12, when a reading request of the image data is inputted from the communication controlling section 11, sequentially reads out the image data from the video RAM and outputs it to the communication controlling section 11.

The printer section 13 prints the image data that is stored in a storing section such as RAM (not shown) onto print medium.

Figure 5:
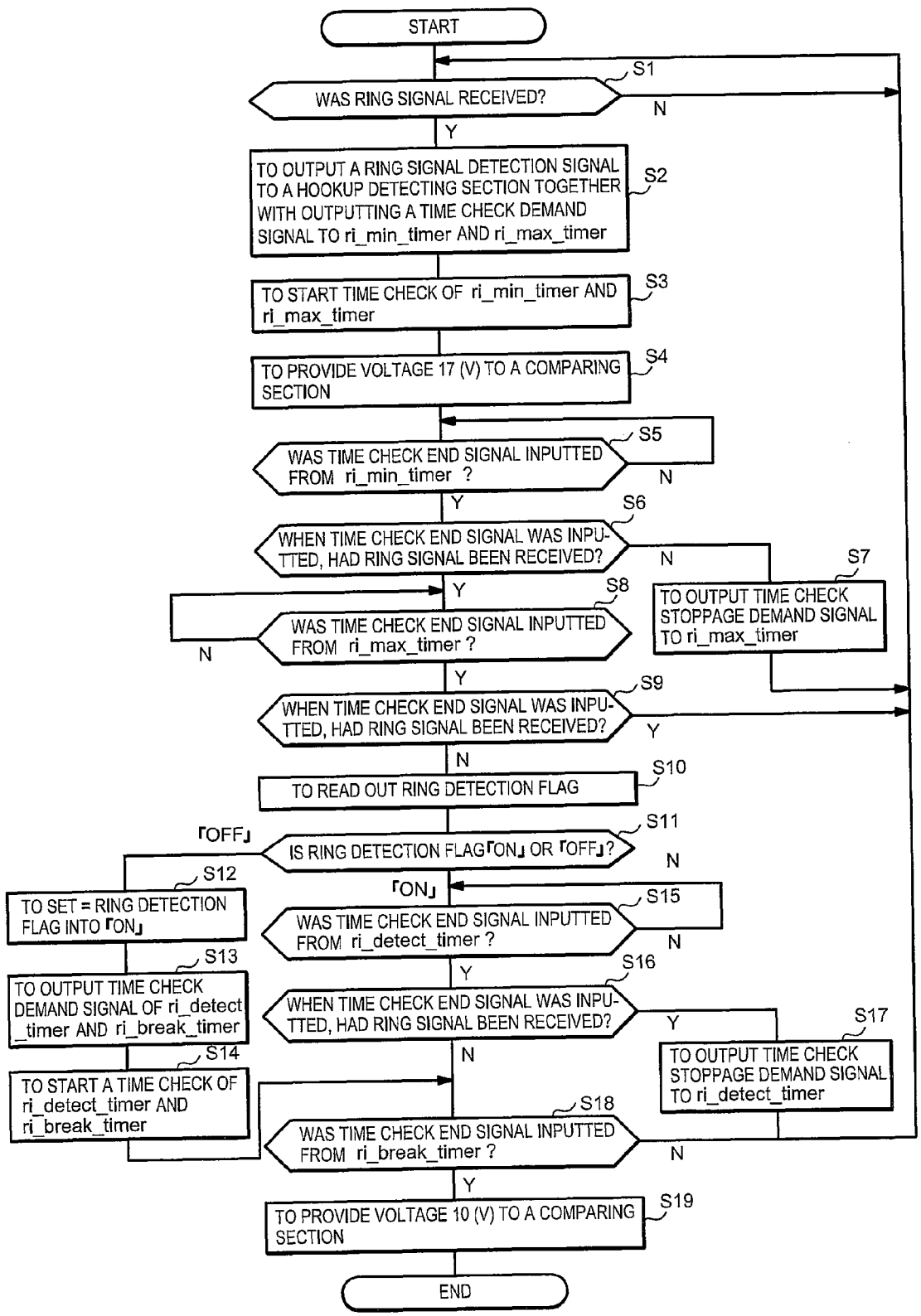
FIG. 5 is a flowchart showing operations of a communication terminal apparatus in embodiment 1 of the present invention.
Figure 6:
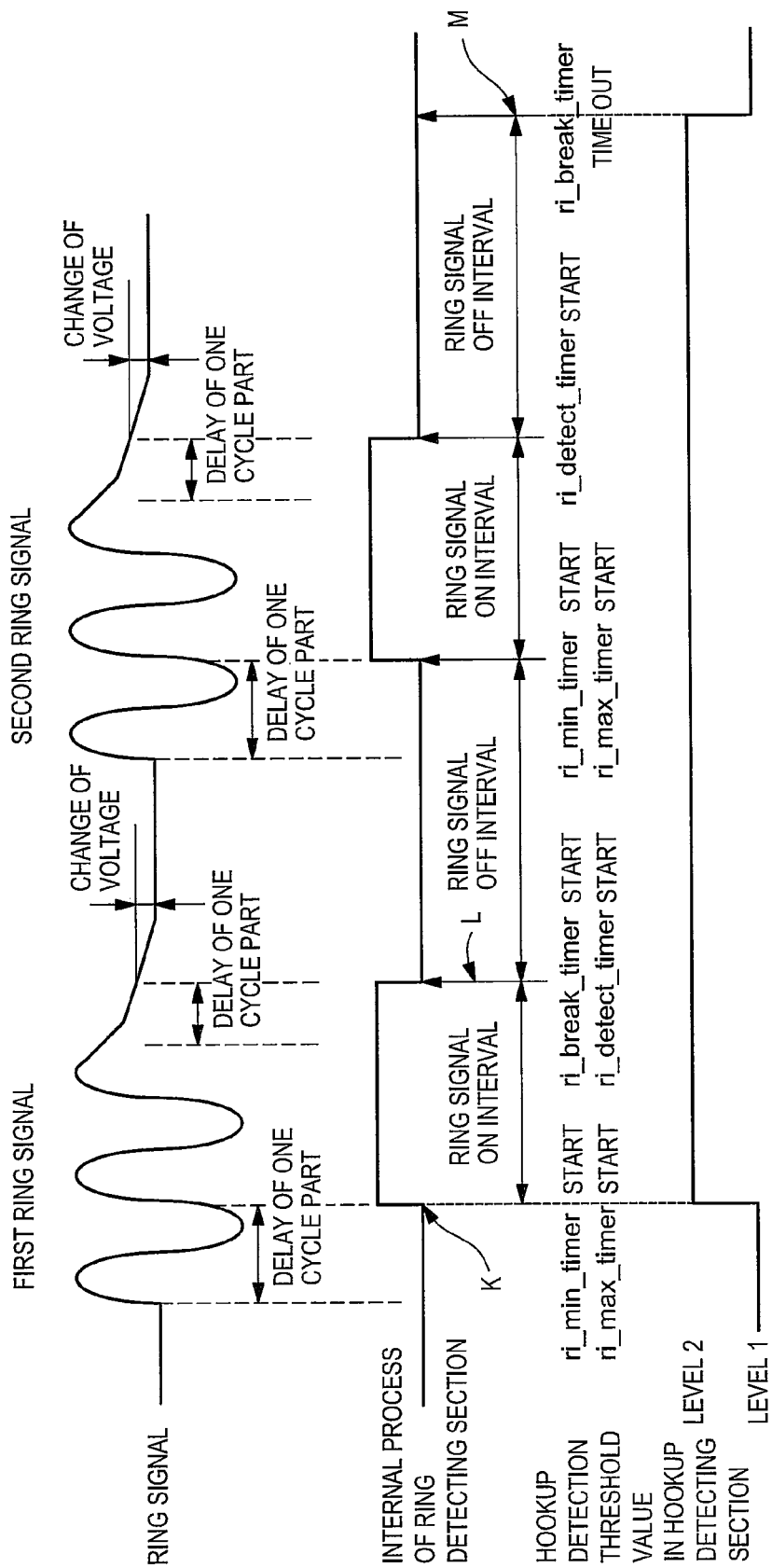
FIG. 6 is a diagram that is used when explaining operations of a communication terminal apparatus in embodiment 1 of the present invention.

The following is to explain operations of the communication terminal apparatus in embodiment 1 of the present invention according to FIG. 5 and FIG. 6.

FIG. 5 is a flowchart showing operations of a communication terminal apparatus in embodiment 1 of the present invention; and FIG. 6 is a diagram that is used when explaining operations of a communication terminal apparatus in embodiment 1 of the present invention.

The ring signal detecting section 115 of the communication controlling section 11, through the condenser 119, the condenser 120 and the resistance 117 and the resistance 118, judges whether or not the ring signal is received from the line 50 (Step S1). On the one hand, the ring signal detecting section 115, when judged that the ring signal is not received from the line 50 (Step S1; N), stands by until the ring signal is detected.

On the other hand, the ring signal detecting section 115, when judged that the ring signal is received from the line 50 (Step S1; Y), after one cycle of the ring signal passes, outputs a time check request signal to the ri_min_timer 111 and the ri_max_timer 112; and outputs a ring signal detection signal representing that the ring signal was detected to the hookup detecting section 116 (Step S2).

The ri_min_timer 111, when the time check request signal stated above is inputted from the ring signal detecting section 115, starts a time check for a period of, for example, 400 ms (refer to a part indicated by a symbol of "K" in FIG. 6). The ri_max_timer 112, when the time check request signal stated above is inputted from the ring signal detecting section 115, starts the time check for a period of, for example, 1200 ms (refer to a part indicated by a symbol of "K" in FIG. 6) (Step S3).

The hookup detecting section 116, when the ring signal detection signal is inputted from the ring signal detecting section 115, executes operations (the explanation of the operation is stated later) of the hookup detecting section as shown by flowchart in FIG. 7. At that time, the selector 1164 forming the hookup detecting section 116, provides the voltage set by the threshold value level 2 to the comparing section 1163 forming the hookup detecting section 116 (Step S4).

Then, the ring signal detecting section 115, judges whether or not a time check end signal representing that the ri_min_timer 111 is in time-out is inputted from the ri_min_timer 111 (Step S5). On the one hand, the ring signal detecting section 115, when judged that the time check end signal stated above is not inputted from the ri_min_timer 111 (Step S5; N), stands by until the time check end signal is inputted from the ri_min_timer 111.

On the other hand, the ring signal detecting section 115, when judging that the time check end signal stated above is inputted from the ri_min_timer 111 (Step S5; Y), at the time that the time check end signal is inputted from the ri_min_timer 111, judges whether or not the ring signal has been received (Step S6). On the one hand, the ring signal detecting section 115, if judged that the ring signal has not been received (Step S6; N) when the time check end signal is inputted from the ri_min_timer 111, recognizes the previously received ring signal as noise, and outputs a time check stoppage request signal to the ri_max_timer 112 (Step S7). Then the flow (process) is moved to Step S1.

By this, the ri_max_timer 112 stops the time check for a period according to the time check stoppage request signal stated above that is inputted from the ring signal detecting section 115.

On the other hand, the ring signal detecting section 115, if judged that the ring signal has been received (Step S6; Y) when the time check end signal is inputted from the ri_min_timer 111, further judges whether or not that a time check end signal representing that the ri_max_timer 112 is in time-out is inputted from the ri_max_timer 112 (Step S8). On the one hand, the ring signal detecting section 115, if judged that the time check end signal stated above is not inputted from the ri_max_timer 112 (Step S8; N), stands by, until the time check end signal is inputted from the ri_max_timer 112.

On the other hand, the ring signal detecting section 115, if judged that the time check end signal stated above is inputted from the ri_max_timer 112 (Step S8; Y), when the time check end signal is inputted from the ri_max_timer 112, judges whether or not the ring signal has been received (Step S9). The ring signal detecting section 115, if judged that the ring signal has been received (Step S9; Y) when the time check end signal is inputted from the ri_max_timer 112, recognizes that the previously received ring signal as noise. Then, the flow (process) is moved to Step S1.

Further, the ring signal detecting section 115, if judged that the ring signal has not been received (Step S9; N) when the time check end signal is inputted from the ri_max_timer 112, reads out the ring signal detection flag from the RAM (Step S10).

The ring signal detecting section 115 judges whether the read out ring signal detection flag is "ON" or "OFF" (Step S11). The ring signal detecting section 115, if judged that the read out ring signal detection flag is "OFF" (Step S11; "OFF"), sets the flag stored in the RAM to "ON" from "OFF" (Step S12), and outputs a time check request signal to the ri_detect_timer 113 and the ri_break_timer 114 (Step S13).

The ri_detect_timer 113 and the ri_break_timer 114, follows the time check request signal that is inputted from the ring signal detecting section 115 to starts a time check for a period that is decided previously (refer to the part shown by symbol "L" in FIG. 6) (Step S14). Then, the flow (process) is moved to Step S18.

In Step S11, the ring signal detecting section 115, when judged that the ring signal detection flag that was read out is "ON" (Step S11; "ON"), further judges whether or not the time check end signal is inputted from the ri_detect_timer 113 (Step S15). On the one hand, the ring signal detecting section 115, when judged that the time check end signal stated above is not inputted from the ri_detect_timer 113 (Step S15; N), stands by until the time check end signal is inputted from the ri_detect_timer 113.

On the other hand, the ring signal detecting section 115, when judged that the time check end signal stated above is inputted from the ri_detect_timer 113 (Step S15; YES), further judges whether or not the ring signal has been received (Step S16) when the time check end signal is inputted from the ri_detect_timer 113. The ring signal detecting section 115, if judged that the ring signal has been received (Step S16; Y) when the time check end signal is inputted from the ri_detect_timer 113, recognizes that the received ring signal is doubling, and outputs a time check stoppage request to the ri_detect_timer 113 (Step S17).

By this, the ri_detect_timer 113, follows the time check stoppage request that is inputted from the ring signal detecting section 115 to stop the time check for a period. Then, the flow (process) is moved to Step S1.

Further, the ring signal detecting section 115, if judged that the ring signal has not been received (Step S16; N) when the time check end signal stated above is inputted from the ri_detect_timer 113, judges whether or not a time check end signal from the ri_break_timer 114 is inputted (Step S18). On the one hand, the ring signal detecting section 115, if judged that the time check end signal is not inputted from the ri_break_timer 114 (Step S18; N), moves to a process of Step S1. On the other hand, the ring signal detecting section 115, if judged that the time check end signal is inputted from the ri_break_timer 114 (Step S18; Y), outputs a ring signal detection period end signal representing that the detection period of the ring signal is ended to the hookup detecting section 116, and stops the time check for a period (refer to the part shown by symbol "M" in FIG. 6).

In the hookup detecting section 116, when a ring signal detection period end signal is inputted from the ring signal detecting section 115, the selector 1164 provides a voltage 10 (v) that is set by the threshold value level 1 to the comparing section 1163 (Step S19); and the sampling signal generating section 1165, stops an output of sampling signal toward the calculating section 1162, and ends the process.

Figure 7:
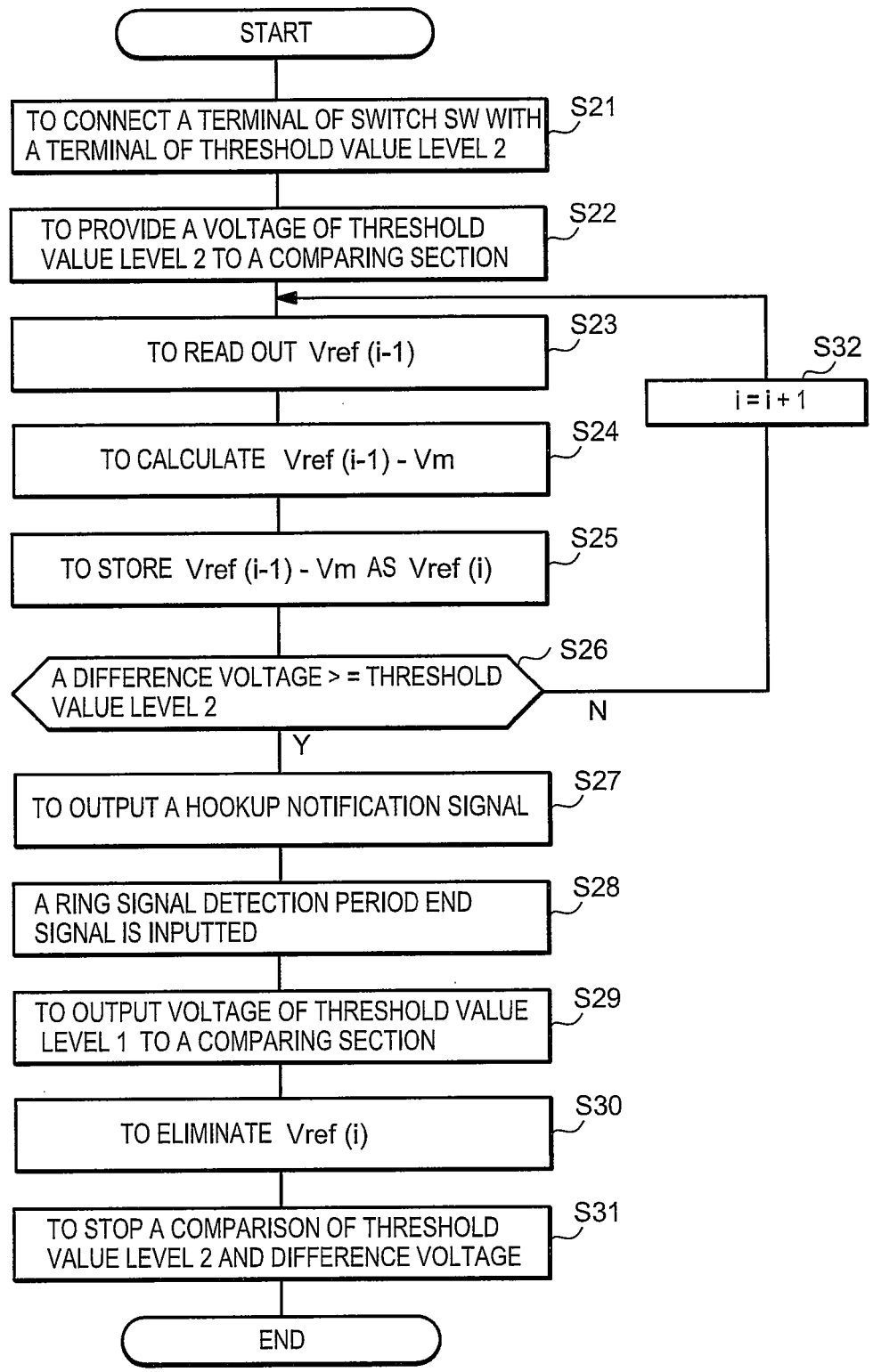
FIG. 7 is a flowchart showing operations of a hookup detecting section in FIG. 1.

FIG. 7 is a flowchart showing operations of a hookup detecting section to constitute the communication terminal apparatus in embodiment 1 of the present invention.

The selector 1164, when a ring signal detection signal is inputted from the ring signal detecting section 115, separates the terminal of switch SW from the terminal that has been provided with the voltage 10 (v) of threshold value level 1, and connects the terminal of switch SW with the terminal that is provided with a voltage of threshold value level 2 (Step S21). By this, the selector 1164 provides the voltage of threshold value level 2 to the comparing section 1163 (Step S22).

Then, the sampling signal generating section 1165, when a sampling start request signal is inputted from the ring signal detecting section 115, after the numerical value "i" that has been written in the RAM is replaced by "1", outputs the sampling signal S(i) according to an predetermined interval.

The calculating section 1162, when the sampling signal S(i) is inputted from the sampling signal generating section 1165, reads out the Vref(i−1) from the Vref(i) storing section 1166 (Vref(0) is a Vo that is inputted from the filter 1161.) (Step S23); and calculates the reference voltage Vref(i) that is obtained by subtracting Vm (0.35 (v)) from the read out Vref(i−1) (Vref(i)=Vref(i−1)−Vm) (Step S24). Next, the calculating section 1162 outputs the calculated reference voltage Vref(i) to the comparing section 1163; and writes it in the Vref(i) storing section 1166 (step S25).

The comparing section 1163, when the reference voltage Vref(i) that is inputted from the calculating section 1162 is inputted, compares the difference voltage between the reference voltage Vref(i) and the line voltage Vo(i) inputted from filter 1161 with the voltage of the threshold value level 2 that is provided from the selector 1164; and judges whether or not the difference voltage is or over the voltage of the threshold value level 2 (Step S26). On the one hand, the comparing section 1163, when judged that a compared result is that the difference voltage is under the voltage of the threshold value level 2 (Step S26; N), adds "1" to "i" (Step S31). Then, the flow (process) is moved to Step S23.

Here, through the comparing section 1163, the case that the difference voltage is under the voltage of the threshold value level 2 is indicated by a range shown by a symbol "A" in FIG. 4(c).

On the other hand, the comparing section 1163, when judged that the difference voltage is or over the voltage of the threshold value level 2 (Step S26; Y), outputs a hookup notification signal representing that the external attachment telephone 14 was hooked up to the ring signal detecting section 115 (Step S27).

Then, the selector 1164, when the ring signal detection period end signal is inputted from the ring signal detecting section 115 (Step S28), separates the terminal of switch SW from the terminal that has been provided with the voltage of the threshold value level 2, and connects the terminal of switch SW with the terminal that has been provided with the voltage 10 (v) of the threshold value level 1. By this, the selector 1164 provides the voltage 10 (v) of the threshold value level 1 to the comparing section 1163 (Step S29).

Further, the sampling signal generating section 1165, when a ring signal detection period end signal is inputted from the ring signal detecting section 115, stops the output of the sampling signal S(i) with respect to the calculating section 1162.

The calculating section 1162 stops the output toward the comparing section 1163, eliminates the reference voltage Vref(i) that is stored in the Vref(i) storing section 1166.

Further, the comparing section 1163, stops the comparison between the difference voltage stated above that is inputted from the calculating section 1162 and the voltage of the threshold value level 2 that is provided from the selector 1164 (Step S31); and ends the process.

According to embodiment 1, on the basis of the comparison result of the comparing section 1163 of the hookup detecting section 116, when the difference between the Vref (i) voltage outputted from the calculating section 1162 and the line voltage Vo is or over the voltage of the threshold value level 2 representing the high voltage that is switched by the selector 1164, the external attachment telephone 14 is detected that it is hooked up. Therefore, as compare with such case using the threshold value voltage 10 (v) representing the low voltage level, it is possible to perform the hookup detection strictly and correctly. Thus, even if the line voltage of the line that is connected with the line exchange machine changes, it is possible to prevent a misunderstanding that the external attachment telephone is hooked up so as to correctly shift to a receiving mode.

Embodiment 2

Figure 8:
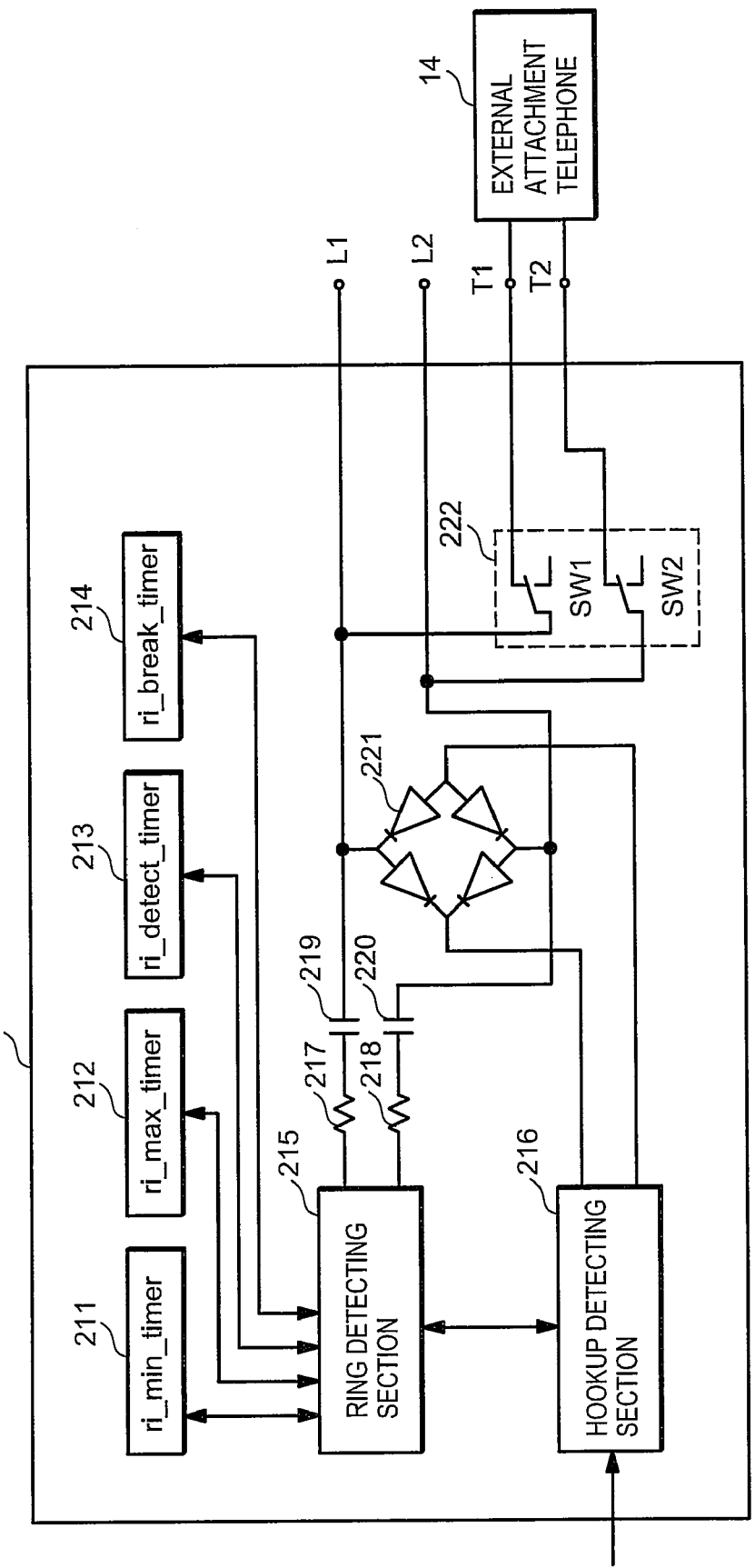
FIG. 8 is a block diagram showing a structure of a communication controlling section in a communication terminal apparatus of embodiment 2 of the present invention.
Figure 9:
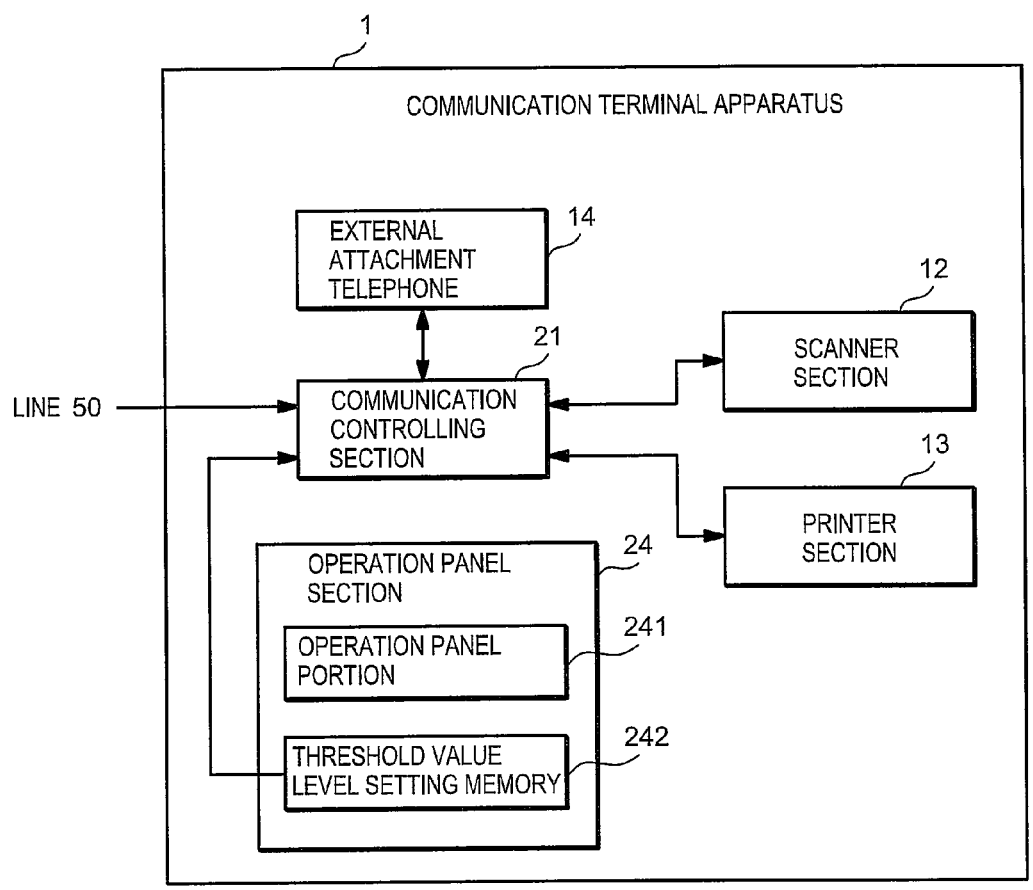
FIG. 9 is a block diagram showing a structure of a communication terminal apparatus in embodiment 2 of the present invention.

FIG. 8 is a block diagram showing a structure of a communication controlling section in a communication terminal apparatus of embodiment 2 of the present invention. The communication terminal apparatus in embodiment 2, as shown by FIG. 9, includes a communication controlling section 21, a scanner section 12, a printer section 13, an external attachment telephone 14 and an operation panel section 24. Here, the scanner section 12, the printer section 13 and the external attachment telephone 14 are respectively the same as that of the embodiment 1.

The communication controlling section 21, as shown by FIG. 8, includes a ring signal detecting section 215, a hookup detecting section 216, a resistance 217, a resistance 218, a condenser 219, a condenser 220, a diode bridge 221, a relay 222, a ri_min_timer 211, a ri_max_timer 212, a ri_detect_timer 213 and a ri_break_timer 214. Here, the ri_min_timer 211, the ri_max_timer 212, the ri_detect_timer 213, the ri_break_timer 214, the ring signal detecting section 215, the hookup detecting section 216, the resistance 217, the resistance 218, the condenser 219, the condenser 220, the diode bridge 221 and the relay 222 are respectively the same as that of the embodiment 1.

Figure 10:
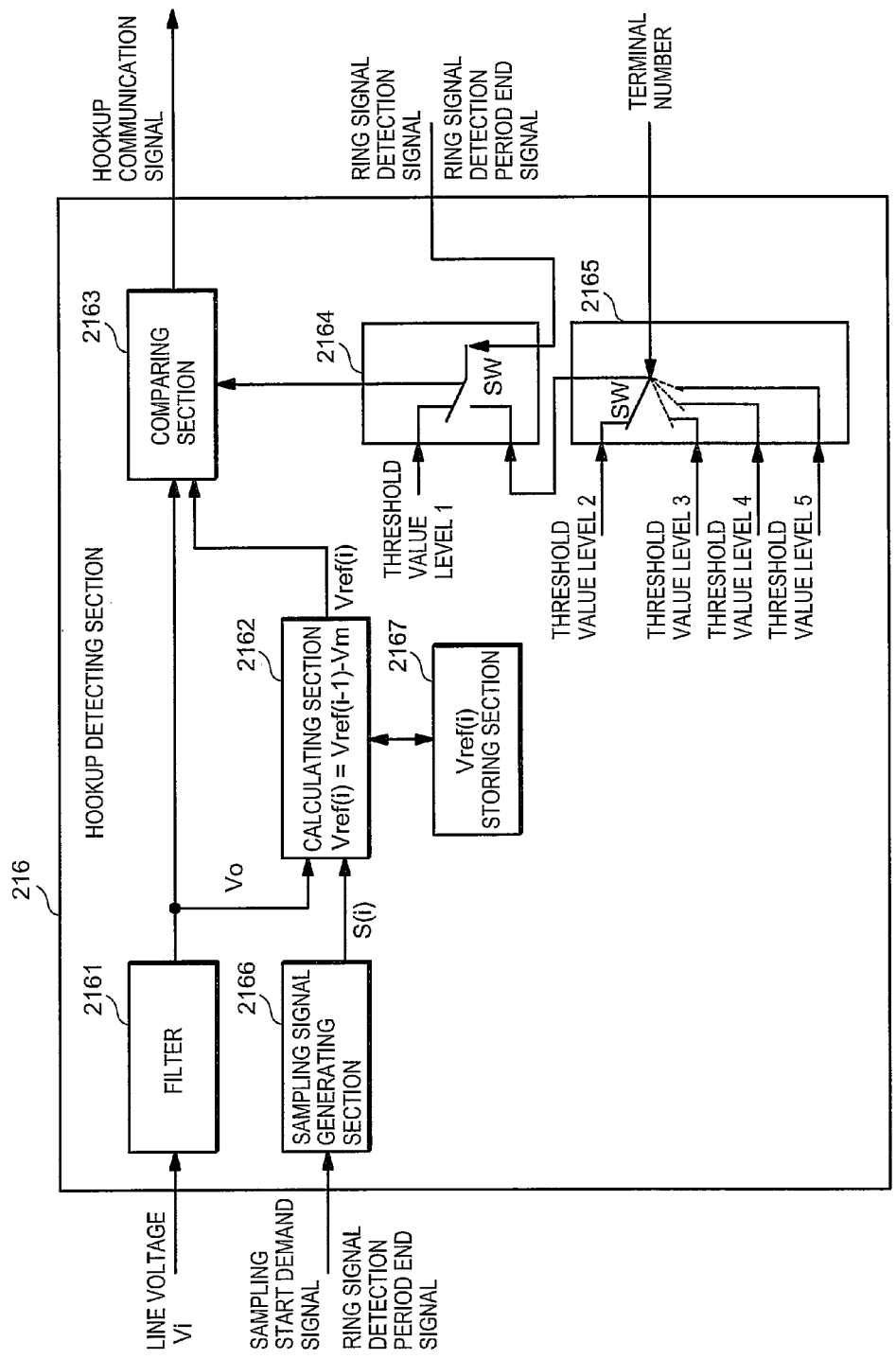
FIG. 10 is a block diagram for showing a structure of a hookup detecting section in FIG. 8.

The hookup detecting section 216, as shown by FIG. 10, includes a filter 2161, a comparing section 2163, a first selector 2164, a second selector 2165, a sampling signal generating section 2166 and a Vref(i) storing section 2167. Here, the filter 2161, the comparing section 2163, the sampling signal generating section 2166 and the Vref(i) storing section 2167 are respectively the same as that of the embodiment 1.

The first selector 2164, when a ring signal detection signal is inputted from the ring signal detecting section 215, separates the terminal of switch SW from the terminal that is provides the voltage V1 of the threshold value level 1, and connects the terminal of switch SW to the terminal that provides one voltage of threshold value level 2, threshold value level 3, threshold value level 4 and threshold value level 5, that is selected by the second selector 2165. Then, the first selector 2164 outputs the voltage representing the voltage threshold value obtained from one of the threshold value level 2, the threshold value level 3, the threshold value level 4 and the threshold value level 5, that is selected by the second selector 2165, to the comparing section 2163.

Here, the voltage of the threshold value level 2, for example, is prescribed as 17 (v), the voltage of the threshold value level 3, for example, is prescribed as 19 (v), the voltage of the threshold value level 4, for example, is prescribed as 21 (v), the voltage of the threshold value level 5, for example, is prescribed as 23 (v).

Further, the first selector 2164, when a ring signal detection period end signal is inputted from the ring signal detecting section 215, separates the terminal that provides one voltage of the threshold value level 2, the threshold value level 3, the threshold value level 4 and the threshold value level 5, that is selected by the second selector 2165 from the switch SW, and connects the switch SW to the terminal that provides the voltage 10 (v) of the threshold value level 1. Then, the first selector 2164 outputs the voltage 10 (v) of the threshold value level 1 to the comparing section 2163.

When one threshold value level of the threshold value level 2, the threshold value level 3, the threshold value level 4 and the threshold value level 5, that is designated by user is inputted from the operation panel section 24, the second selector 2165 connects the terminal that provides the voltage of the designated threshold value level to the switch SW terminal. Then, the second selector 2165 provides the voltage of the threshold value level that is designated by the user to the terminal.

The operation panel section 24 shown by FIG. 9 includes an operation panel portion 241 and a threshold value level setting memory 242. The operation panel portion 241 includes a displaying part that is formed from a liquid crystal display device and an inputting part that is composed of decision button, input keys such as ten keys and the like. The displaying part displays display scene for making user input the designated threshold value level to the communication controlling section 21, such as an operation menu scene (not shown) representing an operation guide, a threshold value level change scene that is used for changing the threshold value level (not shown), or the like.

The threshold value level setting memory 242 stores the threshold value level and the terminal number of the second selector 2165 in pairs.

The following is to explain operations of the communication terminal apparatus in embodiment 2 of the present invention.

Figure 11:
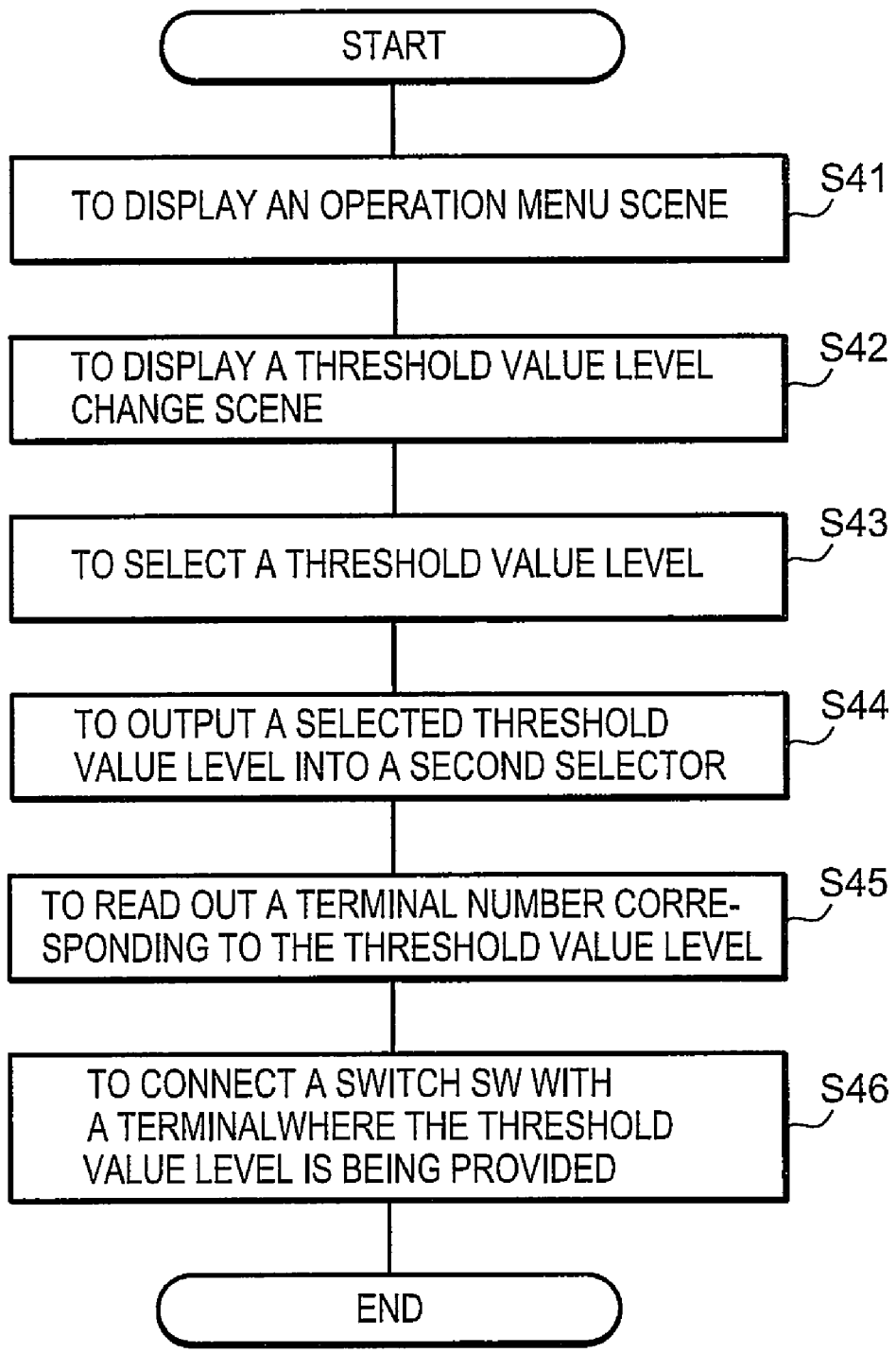
FIG. 11 is a flowchart showing operation to output voltage of threshold value level that is selected by user into a communication controlling section.

FIG. 11 is a flowchart showing operation to output voltage of threshold value level that is selected by user into a communication controlling section.

The FIG. 11 is used for explain a process to set the threshold value level that is designated by user to communication controlling section.

Firstly, the user performs some operation to display the operation menu scene (not shown) representing an operation guide on a displaying part of the operation panel portion 241 (Step S41).

Then, when a button in the operation menu scene is clicked by the user to display a threshold value level change scene (not shown), the operation panel portion 241 displays the threshold value level change scene on the displaying part (Step S42).

Next, when one of the buttons displayed in the operation menu scene and used for designating one of the threshold value level 1, the threshold value level 2, the threshold value level 3, the threshold value level 4, and the threshold value level 5 is clicked by the user (Step S43), the operation panel portion 241 outputs the threshold value level that is selected by the user to the second selector 2165 (Step S44).

The second selector 2165, when the threshold value level that was selected by the user is inputted from the operation panel portion 241, reads out the terminal number corresponding to the threshold value level stated above, from the threshold value level setting memory (Step S45); and connects the switch SW with the terminal of the read out terminal number. By this, the terminal of the second selector 2165 is provided with the voltage of the threshold value level designated by the user. Then, the second selector 2165 outputs a switch signal of terminal connection to the first selector 2164.

The first selector 2164, when the switch signal of terminal connection stated above is inputted from the second selector 2165, separates the switch SW from the terminal that has been provided with voltage 10 (v) of the threshold value level 1; and connects the switch SW to the terminal that is provided with the voltage outputted from the second selector 2165 (Step S46); further ends the process. By this, the comparing section 2163 is provided with the voltage of the threshold value level that was selected by the user.

According to embodiment 2, the operation panel section 24 outputs the threshold value level obtained from one of the threshold value level 2, the threshold value level 3, the threshold value level 4 and the threshold value level 5, that is designated by the user, to the second selector 2165; the second selector 2165 outputs the designated threshold value level to the comparing section 2163 through the first selector 2164; the comparing section 2163, when the difference between the Vref(i) voltage and the line voltage Vo is or over the voltage of the threshold value level that is designated by the user, detects that the external attachment telephone is hooked up. Therefore, it is possible to deal with such voltage change of line voltages that are different from, whenever line exchange machine is connected to the communication terminal apparatus 1.

In embodiment 1 and embodiment 2, the present invention is applied to the communication terminal apparatus 1, it can also be applied to FAX, MPF. Further, in embodiment 2, through the operation of operation panel, the threshold value level can be changed. However, it is possible to adopt such structure to change the threshold value level through using USB to connect a personal computer (PC) and obtaining threshold value level from the personal computer.

The present invention is not limited to the foregoing embodiments but many modifications and variations are possible within the spirit and scope of the appended claims of the invention.

What is claimed is:

1. A communication terminal apparatus, comprising:
   a ring signal detecting section that detects a ring signal that is sent by a line exchange machine on a line; and
   a hookup detecting section that monitors a line voltage of the line and detects a hookup of an external attachment telephone,
   wherein the hookup detecting section, includes:
   a line voltage detecting section that detects the line voltage that is provided to the line;
   a reference voltage outputting section that outputs a reference voltage in order to judge whether or not the external attachment telephone is hooked up;

a threshold value voltage switching section that switches to a first threshold value voltage when the ring signal is detected by the ring signal detecting section, and switches to a second threshold value voltage when shifting to a receiving mode, the first threshold value voltage being higher than the second threshold value voltage; and a voltage comparing section that, when the ring signal is detected by the ring signal detecting section, compares a difference between the reference voltage and the line voltage with the first threshold value voltage, wherein the hookup detecting section detects that the external attachment telephone is hooked up, when the result of the voltage comparing section indicates that said difference is or over the first threshold value voltage.

2. The communication terminal apparatus according to claim 1, further comprising:

a receiving mode detecting section that detects that the communication terminal apparatus shifts to the receiving mode, wherein the threshold value voltage switching section, when the communication terminal apparatus shifts to the receiving mode, switches the first threshold value voltage to the second threshold value voltage.

3. The communication terminal apparatus according to claim 1, wherein the threshold value voltage switching section selects the first threshold value voltage from a plurality of threshold value voltages, each of the plurality of threshold value voltages being higher than the second threshold value voltage.

4. The communication terminal apparatus according to claim 3, further comprising:

a threshold value voltage designating section that designates one of the plurality of threshold value voltages, wherein the threshold value voltage switching section selects the designated one of the plurality of threshold value voltages as the first threshold value voltage.

5. The communication terminal apparatus according to claim 1, further comprising:

a sampling signal generating section that generates a sampling signal at predetermined intervals, wherein the reference voltage outputting section outputs the reference voltage every time the sampling signal is generated by the sampling signal generating section, the reference voltage outputting section calculating the reference voltage by subtracting a pre-decided voltage from reference voltage outputted when the preceding sampling signal is generated.

* * * * *